United States Patent [19]
Janczak

[11] Patent Number: 5,994,848
[45] Date of Patent: Nov. 30, 1999

[54] TRIAC DIMMABLE, SINGLE STAGE COMPACT FLOURESCENT LAMP

[75] Inventor: Jerzy Janczak, Woodhaven, N.Y.

[73] Assignee: Philips Electronics North America Corporation, New York, N.Y.

[21] Appl. No.: 09/034,441

[22] Filed: Mar. 4, 1998

Related U.S. Application Data

[63] Continuation-in-part of application No. 08/833,888, Apr. 10, 1997.

[51] Int. Cl.⁶ ................................................ H05B 37/02
[52] U.S. Cl. ........................ 315/224; 315/307; 315/247; 315/DIG. 4; 315/DIG. 7
[58] Field of Search ........................ 315/224, 307, 315/209 R, 200 R, 247, DIG. 4, DIG. 5, DIG. 7, 244; 363/132, 149

[56] References Cited

U.S. PATENT DOCUMENTS

| | | | |
|---|---|---|---|
| 4,375,608 | 3/1983 | Kohler | 315/307 |
| 4,511,823 | 4/1985 | Eaton et al. | 315/226 |
| 4,782,268 | 11/1988 | Fahnrich et al. | 315/200 R |
| 4,808,887 | 2/1989 | Fuhnrich et al. | 315/247 |
| 5,192,896 | 3/1993 | Qin | 315/224 |
| 5,303,140 | 4/1994 | Shimizu | 363/132 |
| 5,412,287 | 5/1995 | Shackle | 315/247 |
| 5,604,411 | 2/1997 | Venkitasubrahmanian et al. | 315/307 |

FOREIGN PATENT DOCUMENTS

9607297A2  3/1996  WIPO .

*Primary Examiner*—Haissa Philogene
*Attorney, Agent, or Firm*—Edward Blocker; Bernard Franzblau

[57] ABSTRACT

A triac dimmable compact fluorescent lamp including a power feedback circuit. The power feedback circuit helps to maintain the level of current drawn from the triac to at least the level of the triac holding current especially during low dim levels. In one preferred embodiment, the feedback circuit is fed into a junction joining together a pair of fast recovery diodes for converting the high frequency square wave signal into a unidirectional signal supplied to an inverter. Overboost voltages across a buffer capacitor are minimized during low dim levels.

12 Claims, 5 Drawing Sheets

TRIAC DIMMABLE, SINGLE STAGE COMPACT FLOURESCENT LAMP

CROSS-REFERENCE TO RELATED APPLICATION

This application is a continuation-in-part of application Serial No. 08/833,888, filed Apr. 10, 1997, currently pending.

BACKGROUND OF THE INVENTION

This invention relates generally to a ballast for a fluorescent lamp, and more particularly to a triac dimmable, single stage compact fluorescent lamp.

A conventional single stage compact fluorescent lamp, such as disclosed in PCT Patent Application No. WO 96/07297, is designed to provide a high input power factor (p.f) ranging from about 0.93 to 0.99 with low total harmonic distortion (THD). The lamp ballast includes only an output (i.e. inverter) stage commonly referred to as a single stage compact fluorescent lamp. There is no need for an additional stage such as a switch mode power supply for maintaining high p.f Instead, the lamp ballast includes a feedback capacitor for drawing sufficient current from the ballast input to maintain high p.f. A resonant tank circuit is designed to operate in an inductive mode so as to maintain zero voltage switching (ZVS). A voltage across a buffer capacitor of the lamp ballast is generally above its nominal rating during preheat and ignition of the lamp. Consequently, the ballast components must be designed to withstand the voltage stress experienced during lamp start-up.

Unfortunately, the feedback capacitor is undesirably large in size for a CFL in order to draw sufficient current to maintain high p.f. The resonant tank circuit, which serves to maintain ZVS, must be oversized and is relatively expensive. The lamp ballast also includes a choke to compensate for the capacitive impedance of the inverter output. Otherwise, the size of the resonant tank circuit would need to be further increased to achieve ZVS. The need for the choke also undesirably further increases the CFL space requirements.

The lamp ballast is not designed for triac dimming. In particular, unacceptably high overboost voltages will occur across the buffer capacitor during low level dimming (e.g. at about 10% of full light output). At such low dim levels, it can be difficult to continue to draw current through the triac at or above the triac holding current to maintain triac conduction.

The values of many of the components within a conventional triac dimmable CFL also must be changed based on the type of triac and lamp (i.e. burner) employed. The need to change the values of these components in order to accommodate different types of triacs and burners makes it difficult to modularize the feedback components.

Accordingly, it is desirable to provide an improved triac dimmable CFL in which both the buffer capacitor and resonant tank circuit can be significantly reduced in size. Overboost voltages across the buffer capacitor should be minimized especially during low dim levels while continuing to draw current through the triac at or above the triac holding current to maintain triac conduction. The improved triac dimmable CFL, in particular, should provide modularity in regard to the feedback components.

SUMMARY OF THE INVENTION

Generally speaking, in accordance with a first aspect of the invention, a ballast in combination with a triac having a holding current includes a first rectifier having output terminals for converting a low frequency AC signal into a unidirectional signal. The ballast also includes an inverter having input terminals and including a pair of switches joined together at a first junction and a serial combination of a first diode and a second diode joined together at a second junction. The first diode and second diode are connected to an output terminal of the first rectifier and an input terminal of the inverter. A single feedback circuit carries a high frequency square wave signal produced by the inverter and connected to the first junction and the second junction for maintaining the level of current drawn from the triac to at least the level of the triac holding current. The first and second diodes convert the high frequency square wave signal supplied by the single feedback circuit into a unidirectional signal fed back to an input terminal of the inverter.

The power feedback circuit of the invention raises the power factor sufficiently to the minimal level necessary to sustain conduction of the triac. Of particular importance, current at or above the triac holding current is drawn through the triac at low dim levels so as to maintain triac conduction. The level of current fed back to a buffer capacitor within the ballast is insufficient to overboost the voltage across the buffer capacitor even at low dim levels.

It is a feature of the invention that the switches, which are in serial combination, be connected across (i.e. in parallel with) the buffer capacitor. Compatibility for use with any conventional triac dimmer in combination with different types of lamps is thereby achieved. In particular, current is drawn through the triac, including at low dim levels, since the peak to peak voltage applied to the feedback circuit will be equal to at least the voltage across the buffer capacitor. The feedback circuit includes a capacitor. The ballast and triac are integrated within the CFL.

In accordance with a second aspect of the invention, a ballast in combination with a triac having a holding current includes a first rectifier having output terminals for converting a low frequency AC signal into a unidirectional signal. The ballast also includes an inverter having input terminals and including a pair of switches joined together at a first junction and a diode connected to an output terminal of the first rectifier and an input terminal of the inverter. A single feedback circuit carries a high frequency square wave signal produced by the inverter and connected to the first junction and output terminal of the first rectifier for maintaining the level of current drawn from the triac to at least the level of the triac holding current. One of either the diode and rectifier converts the high frequency square wave signal supplied by the single feedback circuit into a unidirectional signal fed back to an input terminal of the inverter.

Accordingly, it is an object of the invention to provide an improved triac dimmable single stage compact fluorescent lamp in which the size of the components can be reduced.

It is another object of the invention to provide an improved triac dimmable single stage compact fluorescent lamp which can sustain triac conduction at low dim levels without experiencing overboost of the buffer capacitor voltage.

It is a further object of the invention to provide an improved triac dimmable single stage compact fluorescent lamp which provides modularity in regard to the feedback components regardless of the type of triac and burner employed.

Still other objects and advantages of the invention, will, in part, be obvious and will, in part, be apparent from the specification.

The invention accordingly comprises several steps in a relation of one or more of such steps with respect to each of the others, and the device embodying features of construction, a combination of elements and arrangement of parts which are adapted to effect such steps, all is exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
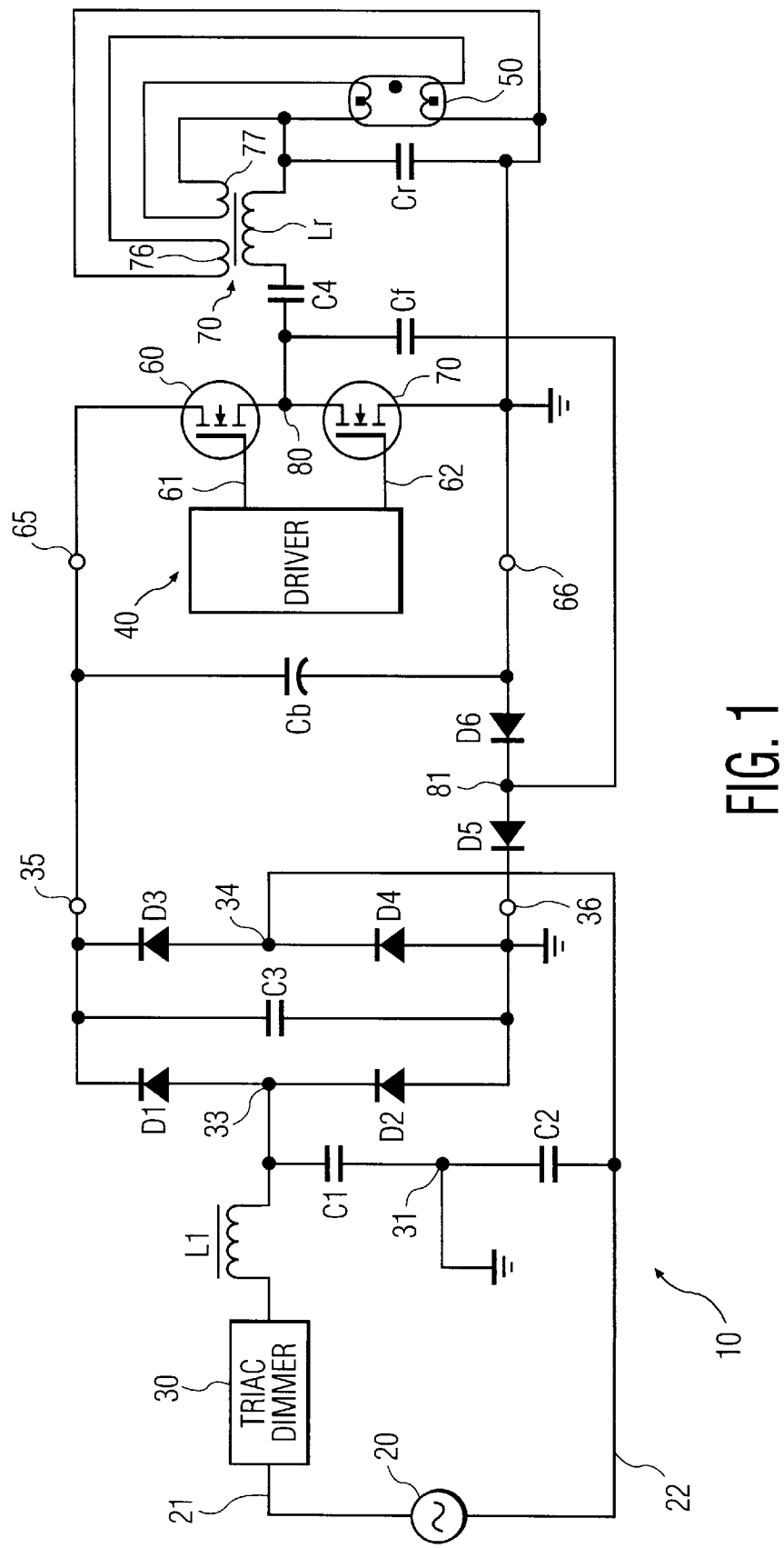
FIG. 1 is a partial block diagram and partial schematic of a triac dimmable, single stage compact fluorescent lamp in accordance with a first embodiment of the invention.

As shown in FIG. 1, a compact fluorescent lamp (CFL) 10 is powered from an A.C. power line represented by an A.C. source 20. The desired level of illumination by a lamp 50 is set by a triac dimmer 30 and is communicated to a driver 40. One type of triac dimmer and driver communication is discussed in application Ser. No. 08/833,888, which is incorporated herein by reference thereto.

Figure 2:
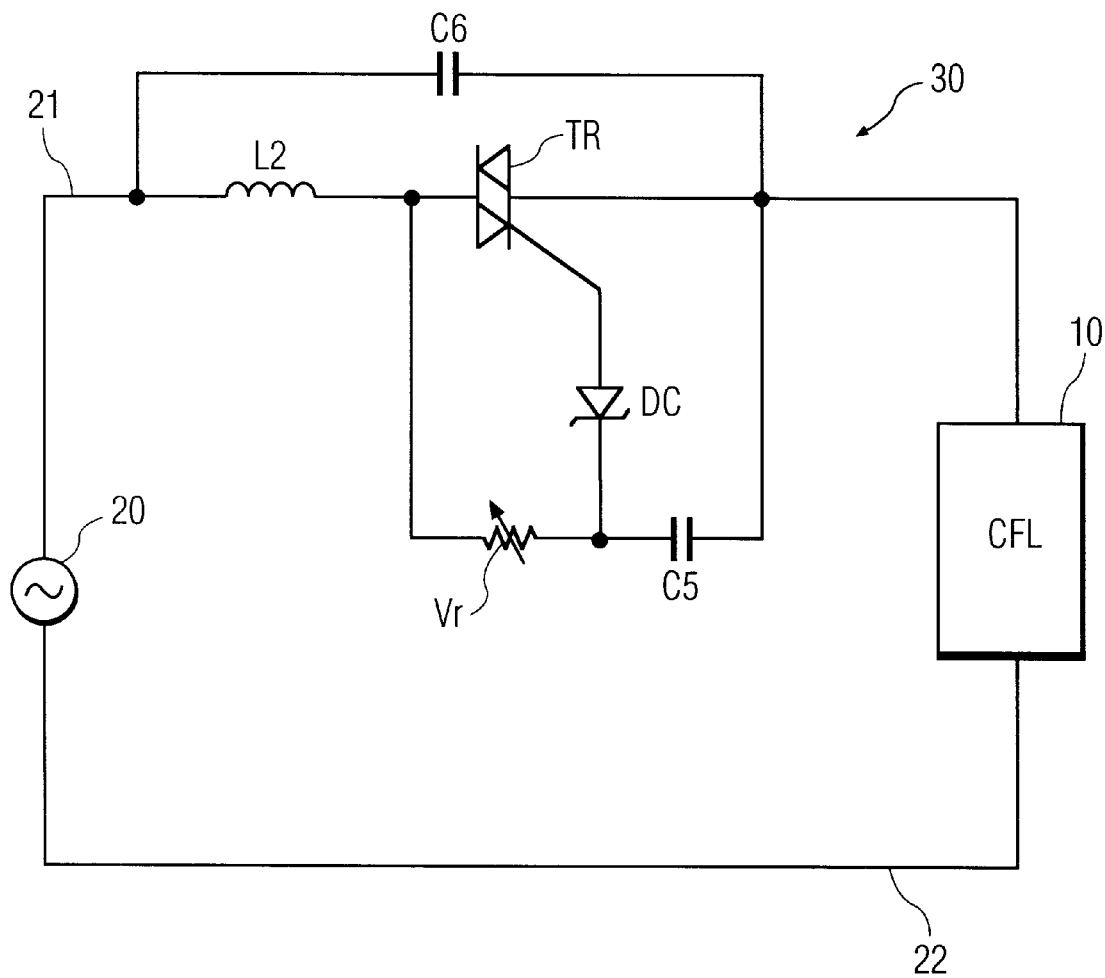
FIG. 2 is a schematic of the triac dimmer of FIG. 1.

As shown in FIG. 2, triac dimmer 30 is connected across A.C. source 20 through a pair of lines 21 and 22. Triac dimmer 30 includes a capacitor C5 which is charged through the serial combination of an inductor L2 and a variable resistor Vr. A diac DC is connected to the gate of a triac TR. When the voltage on capacitor C5 reaches the voltage breakdown of diac DC, triac TR fires. Current (i.e. latching current of triac TR) is supplied to CFL 10 through inductor L2 and triac TR. At the end of the 60 Hz, ½ wave cycle, the level of current in triac TR decreases below its holding current (i.e. minimum anode current necessary to sustain conduction of triac TR). Triac TR turns off. The firing angle, that is, the angle between 0 and 180 degrees at which triac TR first conducts, can be adjusted by changing the resistance of variable resistor Vr. Variable resistor Vr can be, but is not limited to, a potentiometer. The maximum firing angle is limited by the breakdown voltage of diac DC. Inductor L2 limits the rise or fall time of di/dt and thus protects triac TR from a sudden change in current. A capacitor C6 serves as a snubber and prevents flicker.

An electromagnetic (EMF) filter formed by the serial combination of a choke L1 and capacitors C1 and C2, significantly dampens harmonics (oscillations) generated by an inverter of CFL 10. A junction 31, which joins capacitors C1 and C2 together, is connected to a reference level (e.g. ground). The output of triac dimmer 30 is connected to choke L1. The junction joining inductor L1 to capacitor C1 is connected to a first input terminal 33 of a diode bridge. Capacitor C2 is connected to the junction joining A.C. source 20 to a second input terminal 34 of the diode bridge.

The diode bridge is formed by four diodes D1, D2, D3 and D4. The junction joining the anodes of diodes D2 and D4 together is connected to the reference level (e.g. ground). A capacitor C3 connected between the junction joining the anodes of diodes D2 and D4 together and the junction joining the cathodes of diodes D1 and D3 together further dampens harmonics (oscillations) generated by the inverter. The diode bridge rectifies the low frequency, sinusoidal voltage provided by the damped EMI filter resulting in a D.C. voltage with ripple at a pair of output terminals 35 and 36. A buffer capacitor Cb filters so as to make the sinusoidal voltage into a substantially constant D.C. voltage supplied to the inverter.

The inverter is configured as a half-bridge and includes a pair of input terminals 65 and 66, a pair of switches (e.g. power MOSFETs) 60 and 70 which are serially connected across buffer capacitor Cb and a DC blocking capacitor C4. Switches 60 and 70 are joined together at a junction 80 and commonly identified as forming a totem pole arrangement. The MOSFETs serving as switches 60 and 70 have a pair of gates G1 and G2, respectively. Driver 40 controls the switching states of switches 60 and 70 and is connected to gates G1 and G2, respectively.

A primary winding Lr of a transformer 70 and a capacitor Cr form a resonant circuit. DC blocking capacitor C4 is connected between primary winding Lr and junction 80. Lamp 50 is connected in parallel with capacitor Cr. A pair of secondary windings 76 and 77 of transformer 70 are coupled to primary winding Lr for application of voltages across the filaments of lamp 50 in conditioning the latter during the preheat operation and when operating lamp load 50 at less than full light output.

A power feedback circuit formed by a capacitor Cf and fast switching diodes D5 and D6 advantageously permits CFL 10 to operate at a power factor far less than 1.0 (e.g. about 0.7). When the power factor is about 1.0, there is far greater stress on the components within inverter 60 and load 70 than at a lower power factor. The power feedback circuit raises the power factor sufficiently to the minimal level of about 0.7 necessary to sustain conduction of triac 30. The recovery time (i.e. time required to remove charge from the junction of a diode so as to fully turn off the diode) of diodes D5 and D6 can be upto about 100 nanoseconds. In contrast thereto, slow recovery diodes D1–D4 of the diode bridge have recovery times of about 500 nanoseconds.

Figure 3:
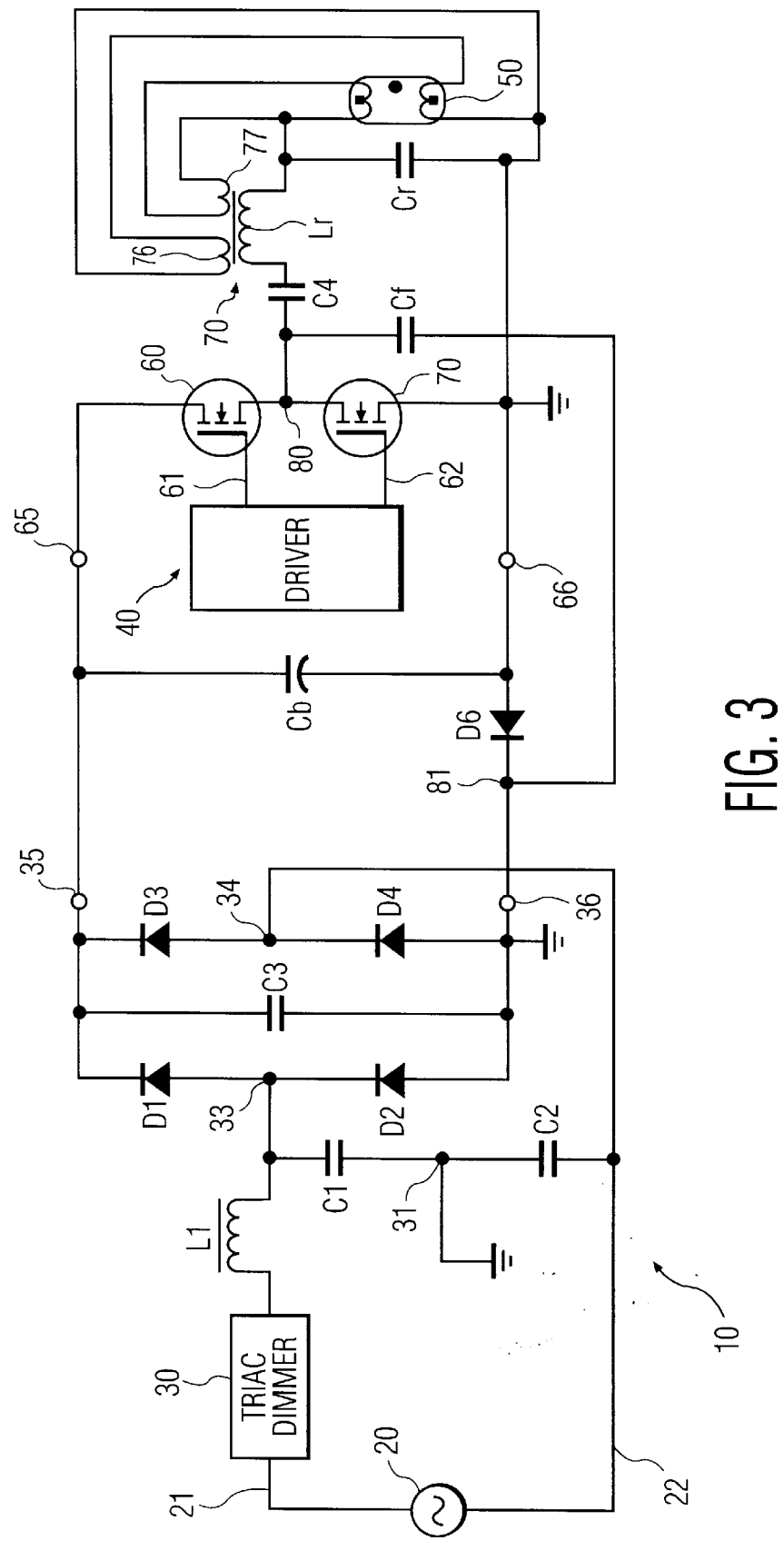
FIG. 3 is a partial block diagram and partial schematic of a triac dimmable, single stage compact fluorescent lamp in accordance with an alternative embodiment of the invention.

Capacitor Cf is connected between junction 80 and a junction 81 joining the anode of diode D5 to the cathode of diode D6. The anode of diode D6 and the cathode of diode D5 are connected to the reference level (e.g. ground). Capacitor Cf feeds back a high frequency (e.g. 50 kH), square wave signal from the output of the inverter (i.e. from junction 80) to the diode bridge. The high frequency square wave signal applied to capacitor Cf creates a current path sufficient to sustain triac dimmer operation for entire dimming range. In an alternative embodiment of the invention as shown in FIG. 3, diode D5 can be removed with junction 81 connected directly to input terminal 36. To accommodate the necessary switching of the high frequency square wave signal being fed back to the diode bridge, however, diodes D2 and D4 would need to have fast recovery times as discussed above.

Figure 4:
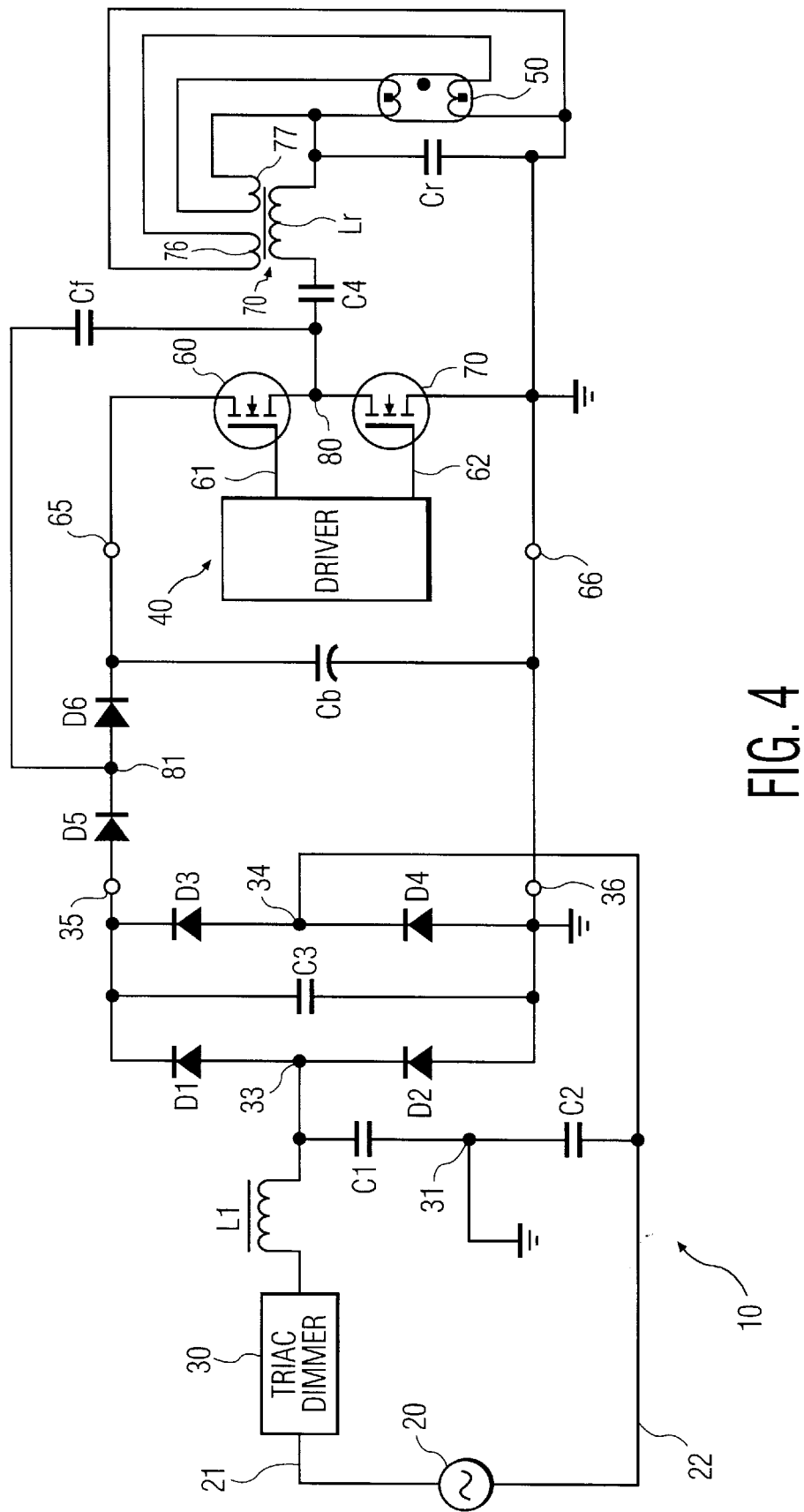
FIG. 4 is a partial block diagram and partial schematic of a triac dimmable, single stage compact fluorescent lamp electrically equivalent to FIG. 1.
Figure 5:
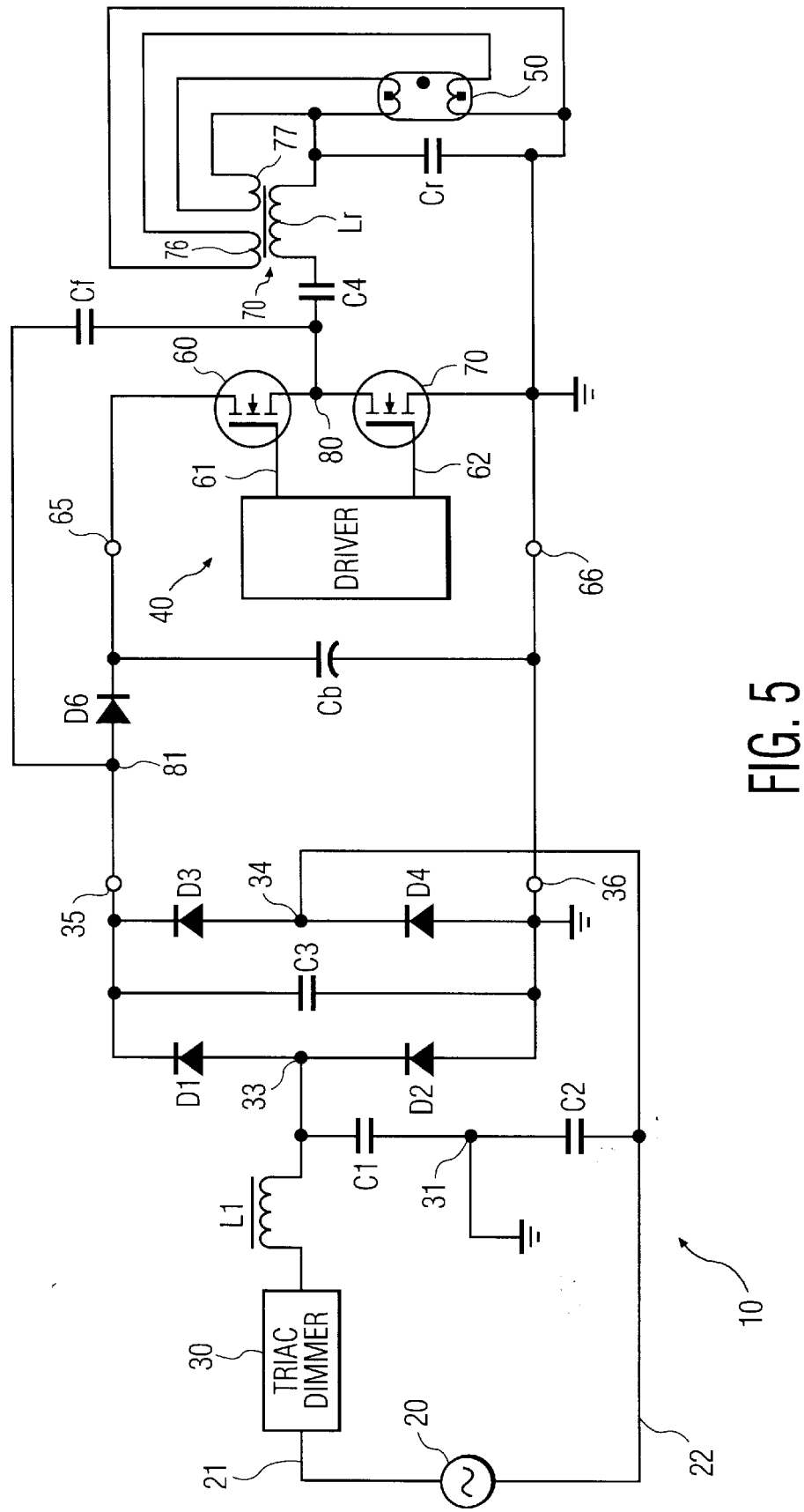
FIG. 5 is a partial block diagram and partial schematic of a triac dimmable, single stage compact fluorescent lamp electrically equivalent to FIG. 3.

The electrical equivalent of FIG. 1 is shown in FIG. 4 in which diodes D5 and D6 are in serial combination between output terminal 35 of the diode bridge and input terminal 65 of the inverter. Similarly, the electrical equivalent of FIG. 3 is shown in FIG. 5 in which diode D6 is connected directly to output terminal 35 of the diode bridge and input terminal 65 of the inverter. To accommodate the necessary switching of the high frequency square wave signal being fed back to the diode bridge, however, diodes D1 and D3 would need to have fast recovery times.

The cut-in angle of triac dimmer 30 ranges from about 30 to 150 degrees. The value of the capacitor Cf is set to sustain triac dimmer operation for the maximum cut-in angle. The feedback scheme is compatible for use with any conventional triac dimmer in combination with different types of lamps. Such compatibility is provided by the peak to peak feedback voltage applied to capacitor Cf (i.e. of the square wave voltage applied to capacitor Cf) being equal to at least the voltage across buffer capacitor Cb. Consequently, the serial combination of diodes D5 and D6 in FIGS. 1 and 4 and diode D6 in FIGS. 2 and 5 should be connected between the diode bridge and the inverter. Current is drawn through triac dimmer 30 except at the zero voltage crossings of switches 60 and 70.

As can now be readily appreciated, the invention permits the buffer capacitor and resonant tank circuit (i.e. primary winding Lr and capacitor Cr) to be significantly reduced in size since there is no need to maintain a power factor of near unity. The power feedback circuit of the invention raises the power factor sufficiently to the minimal level necessary to sustain conduction of triac 35. Of particular importance, current at or above the triac holding current is drawn through triac 30 at low dim levels so as to maintain triac conduction. Unacceptable overboost voltages occurring across capacitor Cb at low dim levels are avoided. Compatibility for use with any conventional triac dimmer in combination with different types of lamps is achieved by the peak to peak feedback voltage applied to capacitor Cf equal to at least the voltage across buffer capacitor Cb.

It will thus be seen that the objects set forth above and those made apparent from the preceding description are efficiently attained and, since certain changes can be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. A ballast in combination with a triac having a holding current, comprising:
   a first rectifier having output terminals for converting a low frequency AC signal into a unidirectional signal;
   an inverter having input terminals and including a pair of switches joined together at a first junction;
   a serial combination of a first diode and a second diode joined together at a second junction, the first diode and second diode being connected to an output terminal of the first rectifier and an input terminal of the inverter; and
   a single feedback circuit carrying a high frequency square wave signal produced by the inverter and connected to the first junction and the second junction for maintaining the level of current drawn from the triac to at least the level of the triac holding current;
   wherein the first and second diodes convert the high frequency square wave signal supplied by the single feedback circuit into a unidirectional signal fed back to an input terminal of the inverter.

2. The ballast of claim 1, further including a buffer capacitor connected in parallel with the serial combination of the pair of switches.

3. The ballast of claim 1, wherein the single feedback circuit includes a capacitor.

4. The ballast of claim 2, wherein the single feedback circuit consists of a capacitor.

5. The ballast of claim 1, wherein the ballast and triac are integrated within a compact fluorescent lamp.

6. The ballast of claim 2, wherein the ballast and triac are integrated within a compact fluorescent lamp.

7. A ballast in combination with a triac having a holding current, comprising:
   a first rectifier having output terminals for converting a low frequency AC signal into a unidirectional signal;
   an inverter having input terminals and including a pair of switches joined together at a first junction;
   a diode connected to an output terminal of the first rectifier and an input terminal of the inverter; and
   a single feedback circuit carrying a high frequency square wave signal produced by the inverter and connected to the first junction and output terminal of the first rectifier for maintaining the level of current drawn from the triac to at least the level of the triac holding current;
   wherein one of either the diode and rectifier converts the high frequency square wave signal supplied by the single feedback circuit into a unidirectional signal fed back to an input terminal of the inverter.

8. The ballast of claim 7, further including a buffer capacitor connected in parallel with the serial combination of the pair of switches.

9. The ballast of claim 7, wherein the single feedback circuit includes a capacitor.

10. The ballast of claim 8, wherein the single feedback circuit consists of a capacitor.

11. The ballast of claim 7, wherein the ballast and triac are integrated within a compact fluorescent lamp.

12. The ballast of claim 8, wherein the ballast and triac are integrated within a compact fluorescent lamp.

* * * * *